(12) United States Patent
Lucas

(10) Patent No.: US 8,786,418 B2
(45) Date of Patent: Jul. 22, 2014

(54) AMBIENT LIGHTING TO REFLECT CHANGES IN VEHICLE OPERATING PARAMETERS

(75) Inventor: Marc Lucas, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 825 days.

(21) Appl. No.: 12/725,642

(22) Filed: Mar. 17, 2010

(65) Prior Publication Data

US 2011/0227716 A1  Sep. 22, 2011

(51) Int. Cl.
*B60Q 1/00* (2006.01)
(52) U.S. Cl.
USPC ............................ 340/439; 340/438; 340/459
(58) Field of Classification Search
USPC ......................................... 340/348, 425, 439
See application file for complete search history.

(56) References Cited

U.S. PATENT DOCUMENTS

| | | | |
|---|---|---|---|
| 3,922,909 A | | 12/1975 | Dixson et al. |
| 4,067,232 A | | 1/1978 | Murray |
| 4,302,815 A | * | 11/1981 | Tedeschi et al. ............... 701/110 |
| 4,305,254 A | * | 12/1981 | Kawakatsu et al. ............. 60/716 |
| 4,538,573 A | * | 9/1985 | Merrick ...................... 123/406.5 |
| 5,042,439 A | * | 8/1991 | Tholl et al. .................. 123/179.2 |
| 5,278,508 A | * | 1/1994 | Bowman ....................... 324/384 |
| 5,373,219 A | * | 12/1994 | Grabowski et al. ............ 318/139 |
| 5,916,130 A | * | 6/1999 | Nakae et al. .................... 60/276 |
| 5,929,595 A | * | 7/1999 | Lyons et al. .................... 320/104 |
| 6,166,449 A | * | 12/2000 | Takaoka et al. ............. 290/40 B |
| 6,336,063 B1 | * | 1/2002 | Lennevi .......................... 701/22 |
| 6,396,394 B1 | * | 5/2002 | Suzuki et al. .............. 340/425.5 |
| 6,536,928 B1 | * | 3/2003 | Hein et al. ..................... 362/464 |
| 6,935,763 B2 | | 8/2005 | Mueller et al. |
| 7,610,974 B2 | * | 11/2009 | Abe ............................ 180/65.21 |
| 7,652,448 B2 | * | 1/2010 | Palladino ....................... 320/104 |
| 7,869,911 B2 | * | 1/2011 | Yamaguchi ...................... 701/22 |
| 7,880,597 B2 | * | 2/2011 | Uchida ......................... 340/439 |
| 8,068,974 B2 | * | 11/2011 | Newhouse et al. ........... 701/123 |
| 8,200,388 B2 | * | 6/2012 | Otake ........................ 701/32.5 |
| 8,386,104 B2 | * | 2/2013 | Kuang et al. .................... 701/22 |
| 2001/0004203 A1 | * | 6/2001 | Matsubara et al. ............. 322/16 |

(Continued)

OTHER PUBLICATIONS

2008 Ford Focus Shows Renewed Commitment to Small Car Market, www.paddocktalk.com, Jan. 7, 2007, 3 pages.

(Continued)

*Primary Examiner* — Jennifer Mehmood
*Assistant Examiner* — Rufus Point
(74) *Attorney, Agent, or Firm* — Shook Hardy & Bacon LLP

(57) ABSTRACT

An interior lighting system that responds to changes in vehicle operating parameters, such as fuel economy, electric power consumption and battery recharging, by changing color of interior lighting. The system includes an engine vacuum sensor associated with the internal combustion engine and, when used on a hybrid vehicle, a motor power draw sensor associated with the vehicle's electric motor and a battery recharging sensor associated with the vehicle's storage battery. An array of color-changing ambient interior lights is provided and is operatively associated with the vehicle system controller. The sensors measure specific changes in driving parameters and send signals to the vehicle system controller for further processing. The vehicle system controller then interprets the received information to identify any changes in operating parameters (fuel consumption, electric power consumption, storage battery recharging), and signals one or more of the ambient lights to change colors and thereby signal the driver (or other occupant) as to a change in operating parameters.

18 Claims, 3 Drawing Sheets

(56) References Cited

U.S. PATENT DOCUMENTS

| | | |
|---|---|---|
| 2007/0001831 A1 | 1/2007 | Raz et al. |
| 2007/0208468 A1* | 9/2007 | Sankaran et al. ............... 701/29 |
| 2008/0112175 A1 | 5/2008 | Bucher |
| 2008/0192499 A1* | 8/2008 | Gardner et al. ............... 362/488 |
| 2009/0040033 A1* | 2/2009 | Uchida ........................ 340/439 |
| 2009/0079263 A1* | 3/2009 | Crumm et al. ................. 307/43 |
| 2009/0145674 A1* | 6/2009 | Lee et al. ..................... 180/65.1 |
| 2009/0174538 A1* | 7/2009 | Shibata et al. ................ 340/438 |
| 2010/0057281 A1* | 3/2010 | Lawyer et al. .................. 701/22 |
| 2011/0125357 A1* | 5/2011 | Harumoto et al. .............. 701/22 |

OTHER PUBLICATIONS

LRX news, www.acurazine.com, Dec. 13, 2007, 18 pages.

\* cited by examiner

US 8,786,418 B2

AMBIENT LIGHTING TO REFLECT CHANGES IN VEHICLE OPERATING PARAMETERS

TECHNICAL FIELD

The present invention relates generally to interior lighting systems for motor vehicles. More particularly, the present invention relates to an interior lighting system that responds to changes in vehicle operating parameters, such as fuel economy, electric power consumption and battery recharging, by changing the color of interior lighting.

BACKGROUND OF THE INVENTION

Interior lighting in vehicles first appeared in the form of dome or dashboard lights or as a light on the B-pillar of the vehicle. These lights were either on and fully illuminated or were off, controlled by a manually operated switch or by a plunger type switch that worked in conjunction with the door. As the automobile developed, additional lights have been included in a variety of places. For example, lights have been fitted to the underside of instrument panels as well as under vehicle seats to illuminate the floor and footwells. Lights have also been fitted to utilitarian areas such as cup holders. Unlike the dome light arrangement, these lights provide indirect or ambient lighting to the vehicle interior. Such ambient lighting may be configured to provide light to almost all areas left dark by conventional dome lights, thus adding to comfort and safety.

As interest in customer convenience and driving satisfaction increased the uses of interior lighting expanded. Today automotive vehicles are provided with interior lighting systems that gradually increase and decrease in intensity when doors are opened or closed or when switched on or off. Automotive vehicles are also fitted with ambient lighting systems that allow the operator and, in some cases, the passengers to change the color of the interior lights to reflect a style or a mood. Accordingly, the colors of lights often found in foot wells, the IP cluster, storage pockets, under seats and in relation to cup holders can be changed easily.

While placement of lights in the automotive interior has developed and lighting effects have been developed so that they are responsive to vehicle occupants, other expanded uses of vehicle interior lighting can be made. Accordingly, as in so many areas of vehicle design, an improved method of using vehicle interior lighting is possible.

SUMMARY OF THE INVENTION

The disclosed invention represents an advancement in the art of interior lighting for vehicles. The disclosed invention is a system for visually informing a vehicle occupant (typically the driver) of changes in vehicle operating parameters by changing the color of the interior's ambient lighting. The measured parameters may include, but are not limited to, changes in vehicle fuel consumption and, when used with a hybrid vehicle, changes in electric power consumption and battery recharging. The system includes an engine vacuum sensor associated with the internal combustion engine and, when used on a hybrid vehicle, a motor power draw sensor associated with the vehicle's electric motor and a battery recharging sensor associated with the vehicle's storage battery. An array of color-changing ambient interior lights is provided and is operatively associated with a vehicle system controller. The array of ambient interior lights includes lights selected from the group consisting of footwell lights, cup-holder lights, dome lights, sidewall lights, lights beneath the vehicle seat, lights beneath the vehicle's instrument panel, and instrument panel gauge cluster lights.

The engine vacuum sensor measures the vacuum created within the intake manifold and sends a signal to the vehicle system controller for further processing. The motor power sensor measures the electric power consumed by the vehicle traction motor and sends a signal to the vehicle system controller for further processing. The battery recharge sensor measures the electric power consumed by the vehicle traction motor and sends a signal to the vehicle system controller for further processing.

The vehicle system controller receives information from the engine vacuum sensor and, when present, from the motor power sensor and the battery recharge sensor. The vehicle system controller then interprets the received information to identify any changes in operating parameters (fuel consumption by the internal combustion engine, electric power consumption by the vehicle traction motor, or the battery state of charge). Thereafter, based on the identification of changes in operating parameters, the vehicle system controller signals one or more of the ambient lights to change colors and thereby signal the driver (or other occupant) as to a change in operating parameters. With such knowledge, the driver may alter his immediate driving technique by, for example, moderating acceleration or deceleration. The operating parameters may be determined by instantaneous measure or may be more broadly determined by efficiencies of the present trip or by average efficiencies of one or more previous trips.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
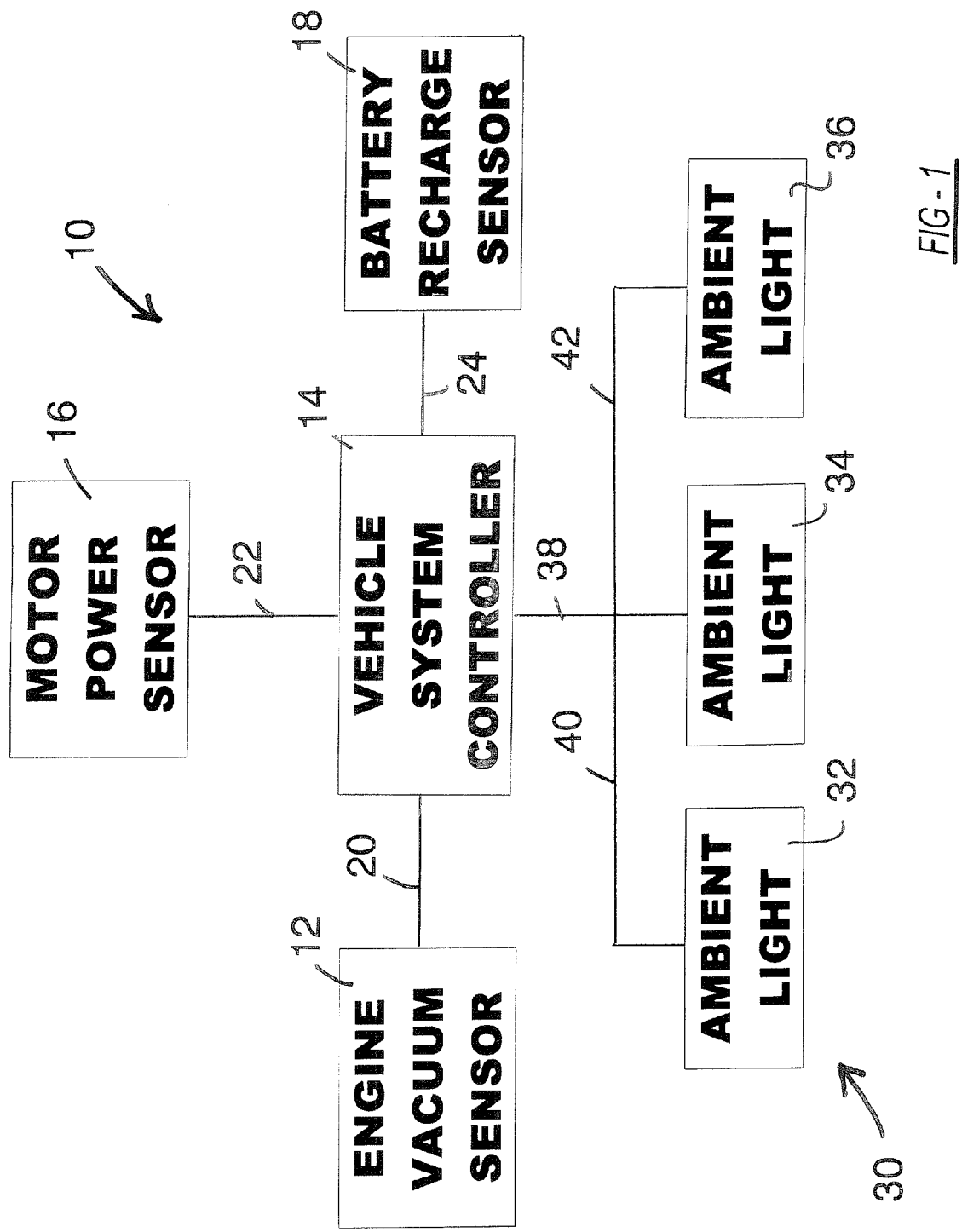
FIG. 1 illustrates a diagrammatic system of the disclosed invention showing the key components of the system.

In the following figures, the same reference numerals are used to refer to the same components. In the following description, various operating parameters and components are described for one constructed embodiment. These specific parameters and components are included as examples and are not meant to be limiting.

The ambient lighting system for responding to changes in vehicle operating parameters of the disclosed invention is provided to inform a vehicle occupant, specifically the vehicle driver, of one or more changes in operating parameters. The system of the disclosed invention has primary use with hybrid vehicles, but could also find use with conventional internal combustion vehicles. Accordingly, the following discussion is intended to describe a system which has utility in both conventional internal combustion vehicles as well as in hybrid vehicles where applicable and is not intended as being limited to one or the other type of vehicle.

With reference to FIG. 1, a diagrammatic illustration of the ambient lighting system of the disclosed invention, generally illustrated as 10, is shown. The ambient lighting system 10 includes an engine vacuum sensor 12 and a vehicle system controller 14. In the case of use in a hybrid vehicle, the ambient lighting system 10 further includes a motor power sensor 16 and a battery recharge sensor 18.

The engine vacuum sensor 12 is operatively associated with the vehicle system controller 14 by an electrical link 20. The motor power sensor 16, where present, is operatively associated with the vehicle system controller 14 by an electrical link 22. The battery recharge sensor 18, where present, is operatively associated with the vehicle system controller 14 by an electrical link 24.

The engine vacuum sensor 12 is associated with the vehicle engine (not shown) in such a way that acceleration of the internal combustion engine can be quantitatively measured. This may be done by physically associating the engine vacuum sensor 12 with the intake manifold of the engine. The engine vacuum sensor 12 measures the vacuum created within the intake manifold and sends a signal to the vehicle system controller 14 for further processing.

For hybrid vehicle applications, the motor power sensor 16, where present, is electrically associated with the vehicle traction motor (not shown) in such a way that electric power consumption by the vehicle traction motor can be quantitatively measured. This may be done by physically associating the motor power sensor 16 with the vehicle traction motor electric circuit. The motor power sensor 16 measures the electric power consumed by the vehicle traction motor and sends a signal to the vehicle system controller 14 for further processing.

The battery recharge sensor 18, where present, is electrically associated with the vehicle's storage battery (not shown) in such a way that electric power generated by the vehicle's electric generating system (not shown) can be quantitatively measured. This may be done by physically associating the battery recharge sensor 18 with the vehicle's storage battery electric circuit. The battery recharge sensor 18 measures the electric power consumed by the vehicle traction motor and sends a signal to the vehicle system controller 14 for further processing.

It is to be noted that the arrangement for measuring power generation or power consumption in a hybrid vehicle as set forth here represents only one of various ways such measurement may be accomplished. Accordingly, the described methods of measurement are set forth for illustrative purposes and are not intended as being limiting.

The vehicle system controller 14 is electrically connected with an array of ambient lights, generally illustrated as 30. The array of ambient lights 30 includes, for example, a first ambient light 32, a second ambient light 34, and a third ambient light 36. The ambient lights 32, 34 and 36 may be of any of a variety of lights and may be selected from the group consisting of light emitting diodes and incandescent bulbs The first ambient light 32, the second ambient light 34, and the third ambient light 36 are of the type that can generate two or more colors. Accordingly, each of the ambient lights 32, 34 and 36 may be composed of two or more lights. Alternatively, each of the ambient lights 32, 34 and 36 may have a light capable of generating more than one color. As a further alternative, the first ambient light 32 may be a different color from the second ambient light 34 and the third ambient light 36. Any combination of these variations may be used.

Figure 2:
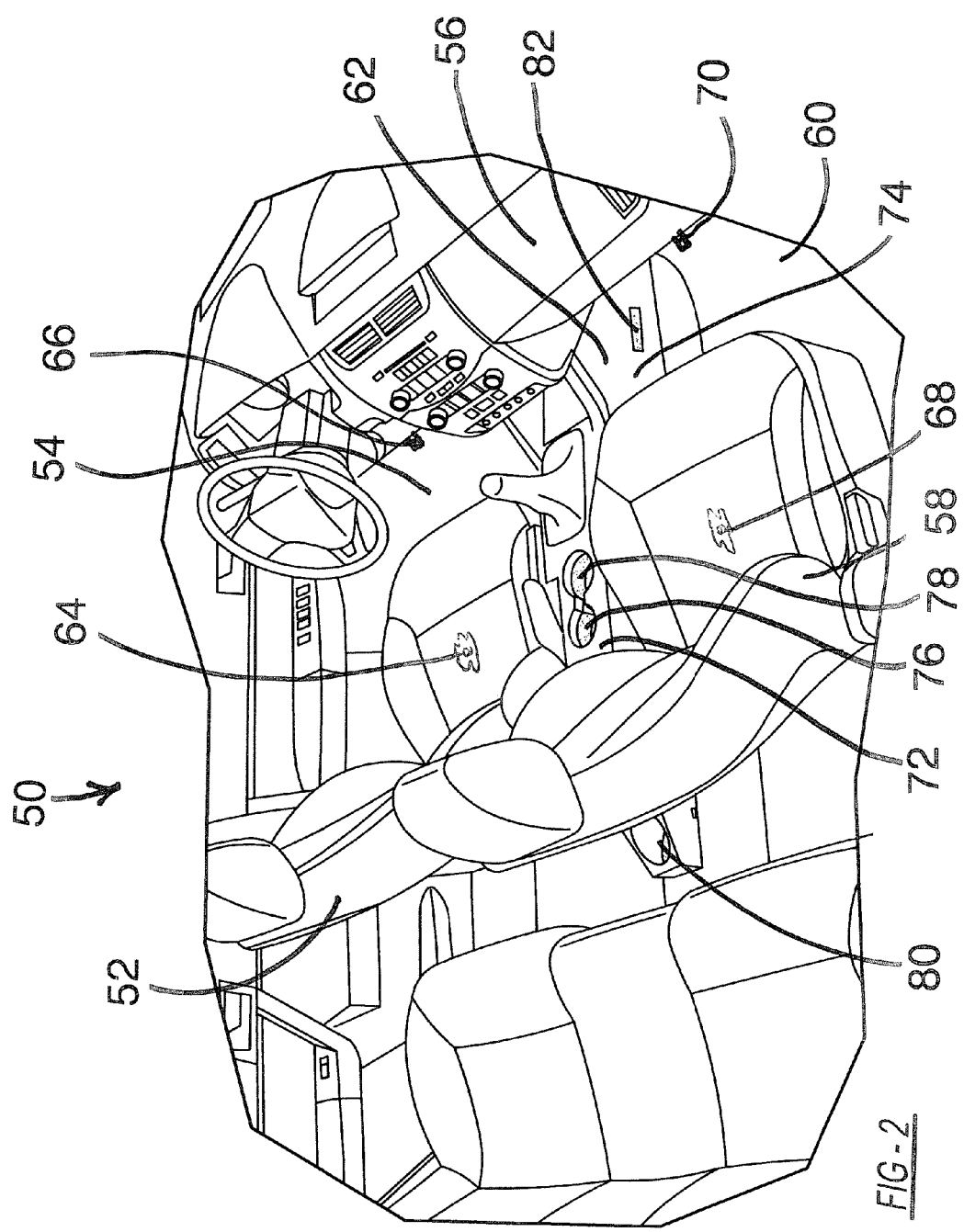
FIG. 2 illustrates a partial view of a vehicle's interior according to the present invention.
Figure 3:
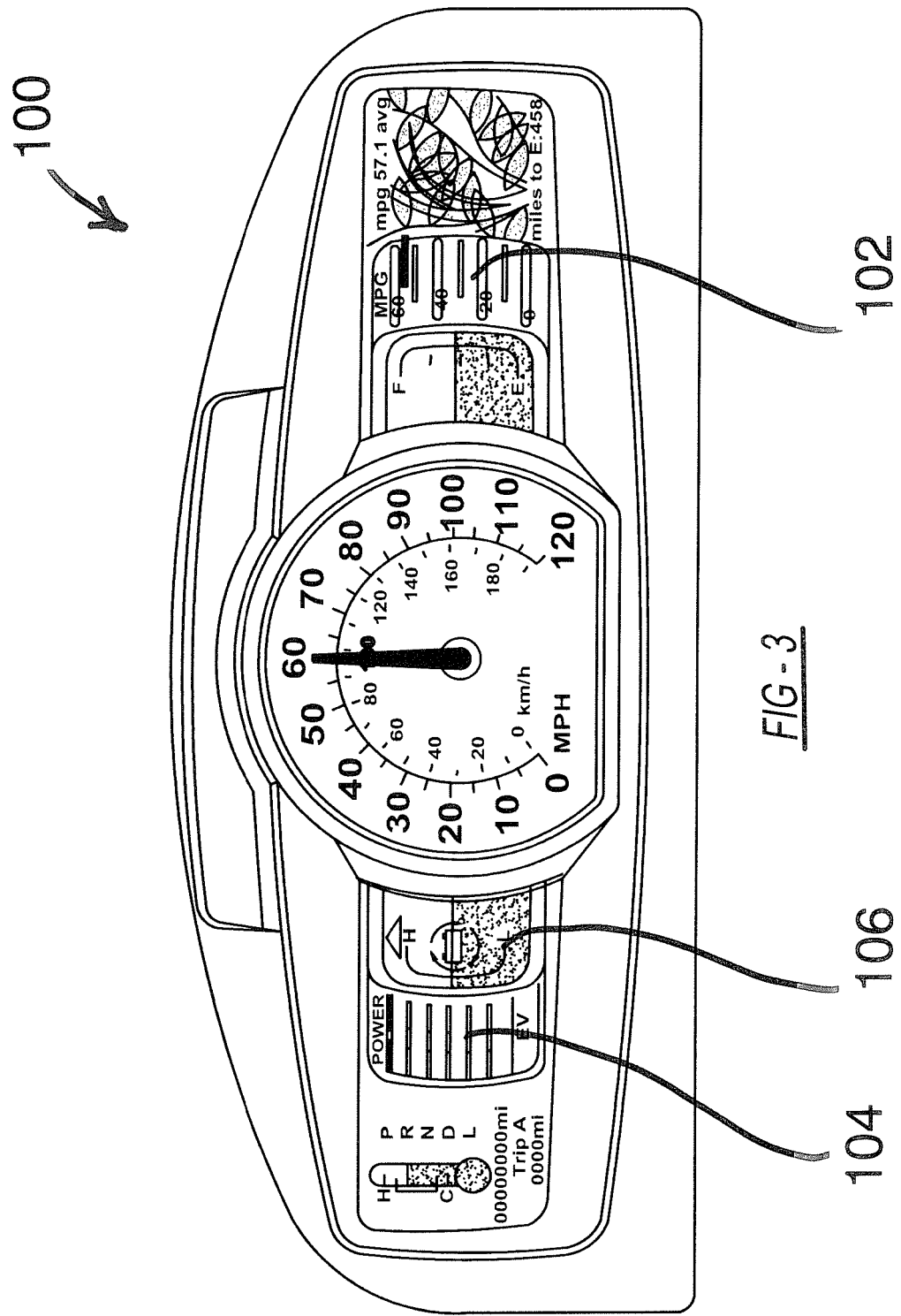
FIG. 3 illustrates a view of the gauge cluster from the instrument panel incorporating lighting elements of the disclosed invention.

As shown in FIGS. 2 and 3 and as discussed below in conjunction therewith, the array of ambient lights is fitted in a variety of places within the automobile interior. Accordingly, the first ambient light 32, the second ambient light 34, and the third ambient light 36 are set forth in FIG. 1 for illustrative purposes only and refer to ambient lights placed, for example, in the vehicle footwell, beneath the vehicle's instrument panel, or beneath one or more of the vehicle's seats. The vehicle system controller 14 is electrically associated with the ambient lights 32, 34 and 36 by electrical links 38, 40 and 42.

The vehicle system controller 14 has several functions and performs them in a stepwise manner. Appropriately programmed software may be provided to effectively and properly manage the multiple operations of the vehicle system controller 14.

First, at Step 1, the vehicle system controller 14 receives information from the engine vacuum sensor 12 and, when present, from the motor power sensor 16 and the battery recharge sensor 18. Second, at Step 2, the vehicle system controller 14 interprets the received information to identify any changes in operating parameters (fuel consumption by the internal combustion engine, electric power consumption by the vehicle traction motor, or the state of storage battery recharging). Third, at Step 3, based on the determination of Step 2, the vehicle system controller 14 signals one or more of the ambient light 32, the ambient light 34, and the ambient light 36 to change colors and thereby signal the driver (or other occupant) as to a change in operating parameters. With such knowledge, the driver may alter his immediate driving technique by, for example, moderating acceleration or slowing down.

The system of the disclosed invention is highly flexible and can be adapted to reflect one or more changes in vehicle operation. The system can indicate direct and instantaneous measurement of fuel or power consumption. For example, in the case of use in an electric vehicle, the system can be used to directly and instantaneously measure voltage and current of the vehicle battery.

The system can also be used to determine and respond to both average energy consumption efficiency as well as energy consumption efficiency for a given trip.

In the former measurement of efficiency, the vehicle system controller 14 calculates an average efficiency (averaged over a calibrateable time during a selected and specific time period). One specific method of calculating average efficiency is to calculate values in Watts-hours per mile/kilometer which are mapped to 0-100% for display to the operator. In this situation the vehicle system controller 14 might calculate the average efficiency based on the engine's instantaneous fuel usage converted to power (in Watts) plus battery power. (Negative battery power in the form of battery charging may be optionally added to this power value.) The sum is integrated over time (that is, over the calibrateable time period) to get an energy value in Watt-hours. For the integrated time period, the average absolute vehicle speed (mph/kph) is calculated. This average speed value is then integrated to determine distance traveled. An efficiency value (in Watt-hours per mile or per kilometer) is calculated as energy consumed over distance traveled (divided by 0 protections). This determined value is then clipped to a calibrateable maximum and minimum, is put through a calibrateable rolling average filter, and is then mapped to a normalized scale of −100%.

At the start of each trip or drive power cycle, the short term efficiency from the previous key cycle, stored in a non-volatile memory, is displayed and is used as a starting point for the new set of calculations.

At the end of the given trip, the calculated value is switched to the energy consumption for a given trip to determine trip efficiency. Particularly, the vehicle system controller 14 calculates the trip efficiency as averaged over the total key cycle. These values are in Watts-hours per mile or kilometer and are mapped to 0-100% for display to the occupant. The vehicle system controller 14 calculates the trip efficiency by taking a rolling average of the average efficiency for an ever-increasing time period and then mapping it to a normalized scale of 0-100% through the same method as set forth above for averaging efficiency.

The light color determination made by the vehicle system controller 14 may direct the ambient lights 32, 34 and 36 to maintain the current color or to change color from a first color to a second color and may optionally illuminate one or more transition colors between the first color and the second color. The color change may be immediate or it may be gradual. For example, the "standard" ambient color may be a warm white or a yellow which changes to a harsher color such as red in response to changes such as an increase in fuel consumption, or to green during motor electric power consumption, battery recharging, or any combination of these conditions.

The ambient light 32, the ambient light 34, and the ambient light 36 illustrated in FIG. 1 and discussed in conjunction therewith are set forth for illustrative purposes. The preferred ambient lights of the disclosed invention are more readily seen in FIGS. 2 and 3.

With reference first to FIG. 2, a partial view of the interior of a vehicle, generally illustrated as 50, is shown. This view of the vehicle interior 50 shows a driver's seat 52, a driver's footwell 54, an instrument panel 56, a passenger's seat 58, a passenger's footwell 60, and a floor console 62.

The vehicle interior 50 is fitted with an array of ambient lights capable of changing color in response to changes in vehicle operating parameters as set forth above. The array of ambient lights includes, without limitation, an ambient light 64 disposed beneath the driver's seat 52 (visible in a partially broken section of the seat base), an ambient light 66 disposed within the driver's footwell 54, an ambient light 68 disposed beneath the passenger's seat 58 (visible in a partially broken section of the seat base), and an ambient light 70 disposed within the passenger's footwell 60.

According to the illustrated first preferred embodiment, the console 62 includes a floor console top panel 72 and a floor console base 74. A set of cupholders in the form of a rearward illuminated cupholder 76 and a forward cupholder 78 is provided in the floor console top panel 72 for use by the driver and passenger. A rear cupholder 80 is provided adjacent the end of the floor console base 74 for use by the rear passengers. The illuminated cupholders 76, 78 and 80 provide ambient illumination. In addition, the floor console base 74 may be provided with one or more side ambient lights 82.

The array of ambient lights shown in FIG. 2 and described above is intended as being illustrative and non-limiting. It is to be understood that either some or all of the ambient lights shown and described may be directed by the vehicle system controller 14 to change colors in response to changes in vehicle operating parameters.

The use of color-changing lights in response to changes in vehicle operating parameters is not, however, limited to ambient interior lights. Rather, other lighting indicators, such as ones incorporated into the gauge cluster of the instrument panel, may also be used in conjunction with the disclosed invention. Accordingly, a gauge cluster incorporating such a lighting signal system is shown in FIG. 3.

With reference to FIG. 3, an instrument cluster, generally illustrated as 100, is shown. The instrument cluster 100 includes a number of gauge features as is understood by those skilled in the art. Particularly, the instrument cluster 100 includes a fuel consumption indicator light 102, an electric power consumption indicator light 104, and a battery recharge indicator light 106. The indicator lights 102, 104 and 106 are electrically linked to the vehicle system controller 14. The indicator lights 102, 104 and 106 operate in response to changes in vehicle operating parameters in the same manner as the ambient lights discussed above and may be used in conjunction with those lights or may be used without the above-discussed ambient lights. The interface to the instrument cluster 100 is a 0-100% signal. All of the required logic/cal resides in the vehicle system controller 14.

Light color changes according to the disclosed invention can be any of a wide variety of color changes in addition to those color changes discussed above. For example, the color changes can be linked to a specific change in operating parameters. It may be that a light color change from green to red would mean an increase in fuel consumption, a light color change from yellow to blue would mean an increase in electricity consumption, and a light color change from orange to brown could indicate battery recharging. In this way the observer will know that a particular change in an operating parameter is occurring.

The foregoing discussion discloses and describes a method of calculating both instant and average driving efficiency which is to be understood as being exemplary only and is not intended as being limiting. It should be noted that there are numerous ways to perform such a calculation and to display the results to the driver. Furthermore, the foregoing discussion sets forth ambient lighting colors (such as red and green) to represent certain driving characteristics. These colors are only suggested as any color or combination of colors could be attributed to any driving habit and not necessarily in the manner discussed and described above. Furthermore, and as noted above, the variety, position and number of lighting elements provided in conjunction with the floor console can be readily altered to meet the requirements of a specific application without deviating from the present invention.

Accordingly, one skilled in the art will readily recognize from such discussion, and from the accompanying drawings and claims that various changes, modifications and variations can be made therein without departing from the true spirit and fair scope of the invention as defined by the following claims.

What is claimed is:

1. A system for visually informing a vehicle occupant of changes in vehicle operating parameters including fuel consumption, electric power consumption and battery recharging on a vehicle having an internal combustion engine, an electric traction motor, and a storage battery, the system comprising:
  a vacuum sensor fitted to the engine;
  a motor power draw sensor associated with the motor;
  a battery recharging sensor associated with the battery;
  a vehicle system controller associated with said sensors; and
  ambient interior lights that are associated with said controller and that include footwell lights, cupholder lights, dome lights, sidewall lights, lights beneath the vehicle seat, lights beneath the vehicle's instrument panel, or a combination thereof, whereby the controller is programmed to change a color of the lights from a warm color to a harsh color in response to increased fuel consumption, change the color of the lights to green during motor electric power consumption, change the color of the lights to green during battery charging, or a combination of the color changes.

2. The system for visually informing a vehicle occupant of changes in vehicle operating parameters of claim 1 wherein the internal combustion engine includes an intake manifold and wherein said vacuum sensor is fitted to said intake manifold.

3. The system for visually informing a vehicle occupant of changes in vehicle operating parameters of claim 1 wherein said motor power draw sensor senses the consumption of electricity by the electric traction motor.

4. The system for visually informing a vehicle occupant of changes in vehicle operating parameters of claim 1 wherein the vehicle includes an electric power generator and wherein said battery recharging sensor senses the voltage level flowing into the storage battery from the electric power generator.

5. The system for visually informing a vehicle occupant of changes in vehicle operating parameters of claim 1 wherein said ambient interior lights include multiple color lights capable of displaying two or more different colors in response to the vehicle system controller.

6. The system for visually informing a vehicle occupant of changes in vehicle operating parameters of claim 5 further including software for interpreting signals from said sensors and for directing said ambient interior lights to illuminate a pre-selected color.

7. The system for visually informing a vehicle occupant of changes in vehicle operating parameters of claim 1 wherein said ambient interior lights includes lights includes instrument panel gauge cluster lights.

8. The system for visually informing a vehicle occupant of changes in vehicle operating parameters of claim 1 wherein said ambient interior lights are selected from the group consisting of light emitting diodes and incandescent bulbs.

9. A system providing visual notification of changes in hybrid-vehicle operating parameters comprising:
an energy consumption sensor;
a vehicle system controller associated with said sensor; and
ambient interior lights that are associated with said controller and that include footwell lights, cupholder lights, dome lights, sidewall lights, lights beneath the vehicle seat, lights beneath the vehicle's instrument panel, or a combination thereof, wherein the controller changes a color of the ambient interior lights between warm and harsh colors in response to changes in fuel consumption, to green in response to electric power consumption, or to green in response to battery charging.

10. The system for visually informing a vehicle occupant of changes in vehicle operating parameters of claim 9 wherein the vehicle includes an internal combustion engine and wherein said energy consumption sensor is operatively associated with the internal combustion engine.

11. The system for visually informing a vehicle occupant of changes in vehicle operating parameters of claim 10 wherein the internal combustion engine includes an intake manifold and wherein said energy consumption sensor is a vacuum sensor fitted to said intake manifold.

12. The system for visually informing a vehicle occupant of changes in vehicle operating parameters of claim 9 wherein the vehicle includes an electric traction motor and wherein said energy consumption sensor is a motor power draw sensor operatively associated with the electric traction motor.

13. The system for visually informing a vehicle occupant of changes in vehicle operating parameters of claim 9 wherein the vehicle includes an electric power generator and a storage battery and wherein said system further includes a battery recharging sensor which senses the voltage level flowing into the storage battery from the electric power generator, said battery recharging sensor being operatively associated with said vehicle system controller.

14. The system for visually informing a vehicle occupant of changes in vehicle operating parameters of claim 9 wherein said ambient interior lights include multiple color lights capable of displaying two or more different colors in response to the vehicle system controller.

15. The system for visually informing a vehicle occupant of changes in vehicle operating parameters of claim 14 further including software for interpreting signals from said energy consumption sensor and for directing said ambient interior lights to illuminate a pre-selected color.

16. The system for visually informing a vehicle occupant of changes in vehicle operating parameters of claim 9 wherein said ambient interior lights includes lights includes instrument panel gauge cluster lights.

17. The system for visually informing a vehicle occupant of changes in vehicle operating parameters of claim 9 wherein said ambient interior lights are selected from the group consisting of light emitting diodes and incandescent bulbs.

18. A vehicle system controller that is attachable to a fuel-consumption sensor and a motor-power-draw sensor and that is programmed with software to execute operations comprising:
receiving signals from the fuel-consumption sensor and the motor-power-draw sensor;
based on the signals, calculating a change in operating parameters related to an engine or a motor; and
changing a color of ambient lights between warm and harsh colors in response to changes in fuel consumption or to green in response to electric power consumption, wherein the ambient lights include footwell lights, cupholder lights, dome lights, sidewall lights, lights beneath the vehicle seat, lights beneath the vehicle's instrument panel, or a combination thereof.

* * * * *